Aug. 27, 1940.    F. L. HALL    2,213,002
WHEEL MACHINING APPARATUS
Filed March 1, 1940    3 Sheets-Sheet 2
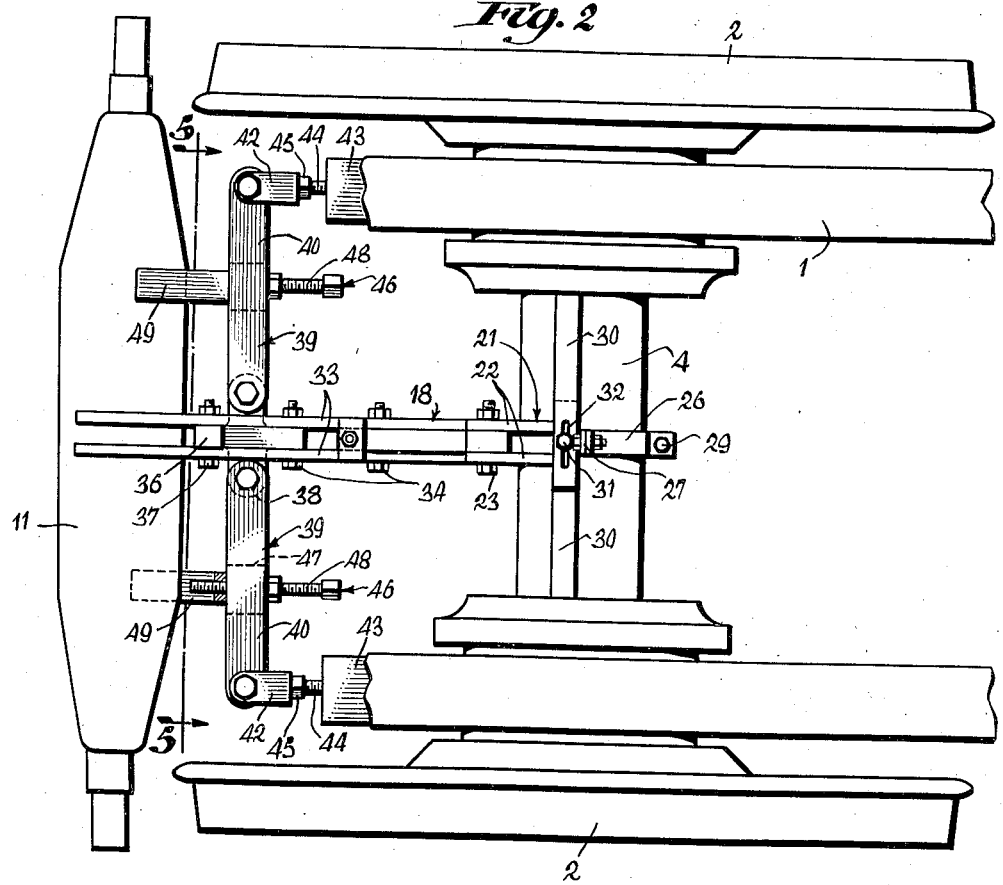
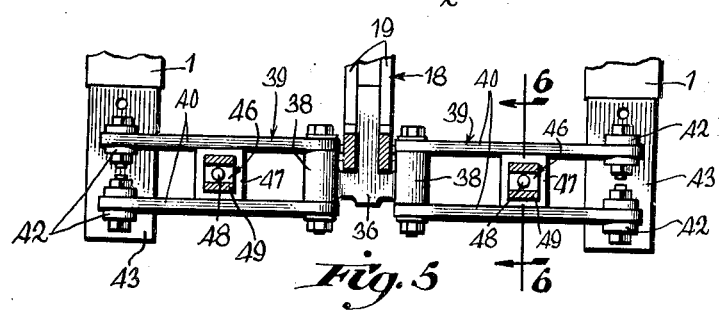
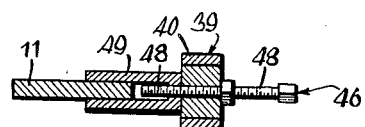
INVENTOR.
Frank L. Hall
BY Oliver B. Kaiser
ATTORNEY.

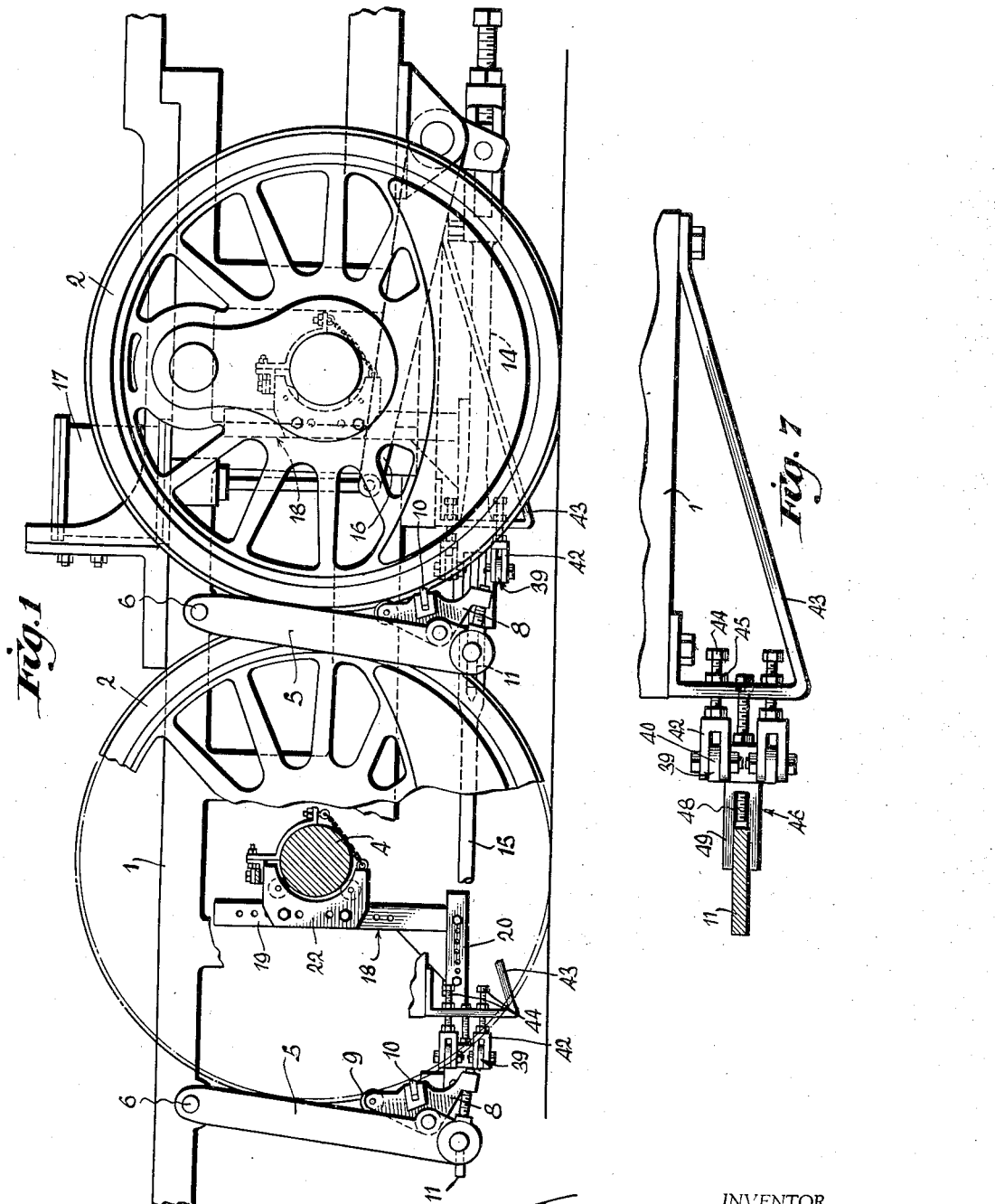

Aug. 27, 1940.                F. L. HALL                2,213,002
                      WHEEL MACHINING APPARATUS
                       Filed March 1, 1940         3 Sheets-Sheet 3
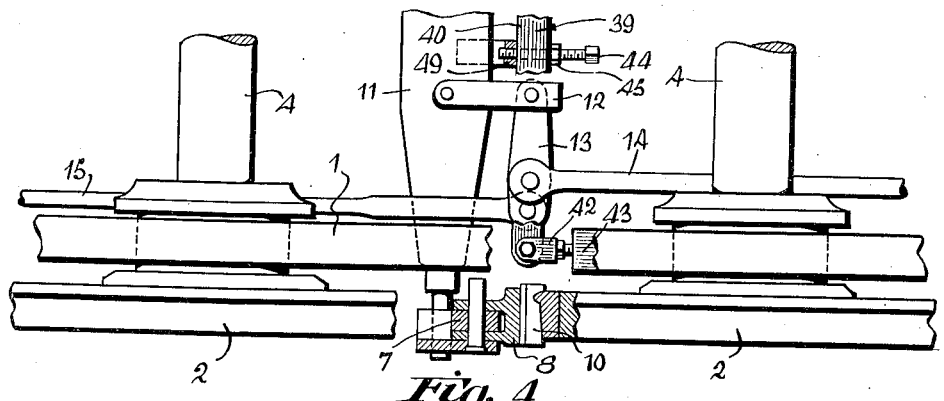
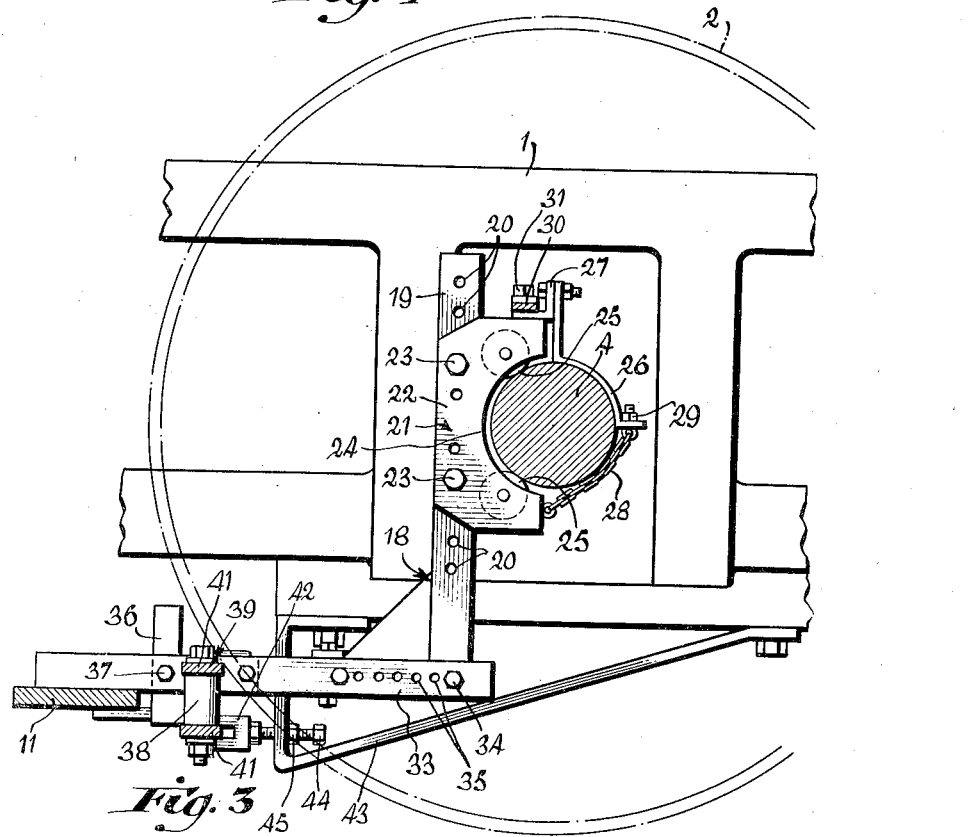
INVENTOR.
Frank L. Hall
BY Oliver B. Kaiser
ATTORNEY.

Patented Aug. 27, 1940

2,213,002

UNITED STATES PATENT OFFICE 2,213,002

WHEEL MACHINING APPARATUS

Frank L. Hall, Cincinnati, Ohio

Application March 1, 1940, Serial No. 321,735

5 Claims. (Cl. 82—4)

This invention relates to apparatus for machining or reconditioning the treads of the tires and flanges of wheels of railroad rolling stock.

The apparatus is primarily applicable to the braking mechanism of the wheels by the substitution of a tool holder and metal cutting tool for the brake head and shoe normally carried by the braking mechanism, whereby the cutting tool is engaged against the tire or tread surface over the wheel when the braking pressure is applied, and the vehicle is transported upon the rails of a section of railroad track.

The invention utilizes the same general principle of operation as disclosed in my Patent No. 2,152,380, issued March 28, 1939, for Wheel machining apparatus.

The present apparatus is designed to meet conditions found due to particular types of underframing or running gear, to appropriately employ a plurality of radius connections between the axle of a set of wheels and the tool holders as disclosed in my prior patent. It will be noted in the prior patent that a tool holder and metal cutting tool is substituted for the brake head and shoe, and a pair of radius bars applied to the axle and engaged on the brake beam to limit and control the degree or depth of cutting feed, thereby holding the same constant for the full circumference of the tread surface of the tire. In this way a definite radius is established with the axis of the wheel to insure machining the tire to a true circle, uniform and equi-distant at all points with the axis of the axle upon which the wheel is fixed. Further, the use of the radius bars insure that the diameters of the tires of the wheel on the same axle or in the same driving wheels base do not vary more than governmental regulations permit. Also, by providing a tool holder to be mounted upon a broke hanger in substitution of a brake head for supporting a cutting tool, a steady rest for the tool is provided.

On certain types of locomotives, however, due to the structure of the running gear or to obstructions, the available span of the axle between the wheels is insufficient to permit effective spacing of the radius bars for accurate or definite control of the feed of the cutting tools.

In order to enable this type of locomotive to be serviced without dismantling the running gear for turning the wheels in a wheel lathe, a single centrally located radius bar is employed for each axle, serving for both wheels of the axle. This is accomplished by anchoring the upper or axle engaging end of the bar to the axle in a manner substantially as described in said prior patent, and the opposite end slidingly to the floating brake beam. A pair of lateral extension bars or wings are secured to the beam supported end of the radius bar adjacent the brake beam, and extend approximately parallel therewith. The outer ends of the bars are pivotally connected to adjustable brackets secured to the engine frame at opposite sides thereof. A pair of adjustable stops engageable with the brake beam are fixed to the lateral extension bars approximately medially of their length, and act as stops for limiting the movement of the brake beam toward the wheels, thus limiting the depth of cut for the proper depth in machining the wheels to a true circle and to uniform size.

It is therefore an object of the invention to provide a mechanism of the character disclosed for restoring the worn tread of the wheels of railway vehicles, applicable to that class of vehicles to which it is impractical or undesirable, due to obstructions of the running gear or frame, to apply a radius bar to the axle for each wheel.

Another object is to provide a mechanism which controls the depth of the cutting tool feed and finishes the wheels to a true circle and uniform diameter for the circumference of the tread of each individual wheel of a pair of wheels mounted on an axle with the use of but a single radius bar or centering device located midway of the axle or at a point where there is no interference with the running gear or frame.

It is a further object to provide apparatus of the character disclosed including a single radius bar engageable on the axle of a pair of wheels to be machined, and a pair of lateral extensions adjustably secured at their outer ends to opposite sides of the frame of the vehicle and carrying spaced adjustable stops engageable with the floating brake beam of the vehicle for determining the proper depth of cutting tool feed, the mechanism adjustable in the several dimensions necessary to apply it to the various sizes and types of railway vehicles.

The radius bar serves a two-fold purpose, to provide a definite feed stop for the cutting tool for accurately machining the wheels to a predetermined diameter, and to hold the tool relative to the tread on the true circumference of the wheel to machine the tread to a true circle regardless of flat or worn spots or possible looseness or irregularities in the wheel bearings or journals.

By utilizing a single radius bar located approximately at the center of the axle between a set of wheels, in conjunction with the lateral bar extensions parallel with the brake beam, fixed at their outer extremities to the engine frame and pivoted at their respective inner ends to the radius bar, with a stop for each end of the floating brake beam fixed to the respective extension bars, it is possible to conveniently install the apparatus and cope with obstructive underframing conditions.

When the centering device is applied on the locomotive frame and axle and the braking pressure applied, the floating brake beam, as under normal braking conditions, moves toward the wheels.

Further objects and advantages of the invention will be more fully set forth in a description of the accompanying drawings, in which:

Figure 1 is a side elevation of one side of a locomotive drive wheel assembly with the present apparatus applied thereon for dressing or turning the tires or treads and flanges of the wheels.

Figure 2 is a top plan view of the apparatus applied upon the engine frame and wheel axle of a locomotive.

Figure 3 is a detailed view of a radius bar or centering device for turning or dressing the tire of a wheel to which the invention is particularly directed.

Figure 4 is a fragmentary top plan view of one side of a drive wheel assembly, illustrating the apparatus applied thereon.

Figure 5 is a section taken on line 5—5, Figure 2.

Figure 6 is a section taken on line 6—6, Figure 5.

Figure 7 is an enlarged side elevation of one of the mounting brackets of the apparatus.

Referring specifically to the drawings, 1 indicates the underframe of a locomotive, and 2, 2, a pair of drive wheels fixed upon relatively opposite ends of an axle 4 journalled in bearings mounted within the underframe in the usual manner. The conventional brake mechanism for the wheels is employed for carrying a tool holder and cutting tool in substitution of the brake head and shoe.

The brake mechanism may be of any conventional type. In the form illustrated, and to the extent it is of utility for wheel tire truing or turning, the brake mechanism comprises a pair of hanger levers 5, 5, depending pivotally suspended upon the underframe at respectively opposite sides thereof, each at its upper end pivotally mounted upon a stud 6 fixed to and projecting laterally from the outer side of the underframe.

The hanger lever at its lower end is provided with a trunnion 7 (Figure 4) for pivotally connecting a brake head thereon, the brake head carrying a shoe for engagement with the tread of the wheel. The brake head and its shoe in truing or turning a wheel tire are removed and a tool holder 8 is substituted, which is characteristic to the brake head, particularly in that it is somewhat of crescent outline to provide a pair of arms projected or extending from relative opposite sides of its fulcrum, the upper extremity thereof journalling a roller 9 for making an anti-friction contact against the circumferential surface of the tread or tire of the wheel. Intermediate of its arms or ends, the tool holder is transversely grooved for the reception of a metal cutting tool 10 which acts upon the wheel tire or tread surface for truing the same.

The hanger lever at its lower end is provided with a bearing for making a trunnion connection with a horizontally disposed floating brake beam 11. The brake beam extends crosswise of the underframe, approximately parallel with the wheel axle, and provides a connecting link for a pair of hanger levers extending from relatively opposite sides of the underframe. Upon actuating the brake beam, the hanger levers are oscillated or moved to bring the tool holder and its cutting tool either into or away from cooperation with the wheel in a manner substantially the same for operating a brake head and its shoe to apply to release the brake shoe for a wheel braking control.

A bracket 12 is secured to and projects from the floating brake beam 11, as illustrated in Figure 4, and at its outer end has a lever 13 pivotally connected thereto. The lever 13 normally extends at right angles from the bracket, and has the usual brake rods 14 and 15 pivotally connected thereto at its outer end.

The brake rod 14 extends longitudinally of the underframe and has its forward end pivotally connected to a bellcrank lever 16 mounted upon the underframe and in connection with the piston operative within a fluid pressure cylinder 17. The brake rod 15 extends in an opposite direction from the brake rod 14 to connect with a brake beam 11 of a second brake mechanism, in duplicate of the first heretofore described, for serving a second set of wheels. The brake mechanism for the drive wheels on one side of the locomotive is in duplicate for the relative wheels at the opposite sides, insofar as the actuating connections and parts for operating a brake beam are concerned. The brake mechanism illustrated is of conventional type and may, in substitution, correspond to any other type with which a locomotive or truck or railway vehicle is equipped for suspendingly sustaining a brake head and shoe for cooperation with the wheel tread, and which will permit the brake head and shoe to be removed and an appropriate tool holder and metal cutting tool substituted so as to be actuated by and through the control of the brake mechanism for moving the cutting tool into and out of active position with the wheel tire or tread for machining or truing the tread surface and flange of the wheel without removal of the wheel from the anxle or dismantling the running gear from the vehicle.

In the use of the braking mechanism as the means for sustaining and operating the tool holder, its application is the same whether the brake shoes engage either a front or rear side of the wheel excepting that its position governs the direction of wheel rotation for machining or turning. When the brake shoes are located on the front side, the locomotive or vehicle is moved forwardly and when located in the rear of the wheel the direction of movement is reversed or backward. As illustrated, the apparatus is adapted to recondition one or several wheels simultaneously without change of operation, recognizing, however, that the cutting tool for each wheel is appropriately set so as not to unduly influence the effectiveness of the other cutting tools for the several wheels.

After the tools have been properly set within their holders, air is applied to the air pressure cylinder which forces the holders and their respective cutting tools against the tires of the wheels, whereupon the locomotive is moved very slowly by some suitable motive power as by another locomotive or a winch, known as a "Ledgerwood."

The metal cutting tool 10 may be either of sectional form or one piece, the sectional form being usually employed in making a roughing cut, one section serving for the tread and a second for the flange, while the tool for making a finishing cut is usually of one piece taking in both the tread and flange, and in some instances, a particular shape is employed for removing burrs from the outside edge of the tire. The cutter can be changed as desired by relieving of brake cylinder pressure, after which it can be easily removed for replacement.

As shown in Figures 1, 2, and 3, the radius or centering device 18 is preferably of right angle form of a pattern similar to the radius bar disclosed in my prior patent. In the present instance, as only one radius connection is required, it is located preferably centrally of the length of the axle. The angle form provides for convenience in making adjustments to meet different sizes of wheels and measurements between the wheel axle and brake beam with which the bar connects.

The bar 18, therefore, provides a vertical limb having a yoke 19 adjustably mounted thereon. The limb is provided with a series or row of holes 20 for making different yoke elevation adjustments. The yoke 21 comprises a pair of plates 22, one on each side of the bar beam and clamped thereto by the bolts 23 engaged through the holes 20 in the beam.

The plates 23 have a semicircular recess 24, adapting the same to straddle and engage about one side of the wheel axle. A pair of rollers 25, 25, at the respective upper and lower sides of the yoke, are journalled between the yoke plates and engage against the axle providing an anti-friction bearing. The yoke is confined upon the axle by a yoke clip 26 secured to the upper edge of the yoke plates by means of a bracket 27. The clip 26 extends partially about the axle and is joined at its lower edge by a length of chain 28 connected to the lower edge of the yoke. The connection may be adjusted by a screw 29, serving to tighten the chain and clamp the yoke securely to the axle. If desired, the clip 26 may be dispensed with, and the chain 28 lengthened to extend from the lower edge of the yoke to the upper edge to be fastened to the bracket 27.

The radius bar or beam may be located and held in position laterally relative to the axle by means of an extensible tie or spreader bar 30. The bar is sectional and secured to the yoke by means of a bolt 31 engaged through a slot 32 in the respective bars, permitting the bars to be extended laterally, contacting the engine frame at opposite sides and rigidly clamped by the bolt 31.

The lower or horizontal limb of the radius bar 19 comprises a pair of bars 33, rigidly secured to the vertical limb by means of bolts 34. The bars 33 include a series of holes 35 for making adjustments to adapt the radius bar to meet different measurements between the wheel axle and brake beam. The free ends of the horizontal bars 33 extend over and rest on the brake beam 11.

The limb, at its free end adjacent the brake beam, is provided with an L-shaped clip 36, secured thereto by bolts 37, providing a stop for the inward movement of the brake beams. The L-shaped clip 36 is clamped between the respective bars of the horizontal limb, and includes at opposite sides a pair of ears 38, 38, for making a pivotal connection to the inner ends of a pair of limbs or links 39, 39, extended laterally from opposite sides of the radius bar and pivotally connected to opposite sides of the engine frame. Each of the extension bars 39 is of duplex construction, as illustrated in Figure 5, preferably of parallel bars 41, 41, and spaced to provide clearance to permit brake rods 14 and 15 to pass therebetween.

Each of the bars or links 39 extends laterally from opposite sides of the radius bar, approximately parallel with the brake beam, with the outer or free ends engaged in clevises 42, one respectively for each bar of the pair making up the duplex construction. The clevises are adjustably mounted on a bracket 43, which is bolted to the frame of the vehicle beneath the bearing assembly of the frame. Each clevis is mounted for adjustment on a bolt 44 screw-threaded in the bracket, and having a lock nut 45 to lock the same in the adjusted position.

A pair of stops 46 are provided, one for each link, located approximately medially of one of the links. Each stop is made up of a block 47, welded or otherwise secured between the respective bars of each limb. The block is screw-threaded for engagement of an adjustable stop screw 48. A lock nut is provided on the stop screw for permitting the same to be locked in adjusted position. The stop screws may be adjusted or set relative to the brake beam for a definite feed of the cutting tool for turning the wheels down to the predetermined diameter. Each stop is provided with a bifurcated clip 49 secured to the block for straddling the brake beam to stabilize the apparatus.

The centralized location of the radius beam permits a beam to be readily applied between the axle and brake beam of locomotive drive wheels in such instances where obstructions interfere with the application of a pair of spaced beams. The stops limit the movement of the brake beam in the wheel braking direction, thereby correspondingly limiting the cuting feed or depth when the braking pressure is applied. The beam provides the equivalent of a direct radius connection between the axis of the axle and the fulcrum of the tool holder, and its anti-friction connection with the axle allows sufficient freedom for axle rotation. The outer ends of the lateral extension bars being pivoted on the frame of the engine, the thrust of the brake beam against the stops is transmitted to the centralized radius bar, thereby controlling the tool feed on the true axis of wheel rotation.

The radius bar, with its lateral extensions or wings 39, limits the movement of the brake beam 11 in a wheel braking direction, thereby correspondingly limiting the cutting feed or depth of the cutters when the pressure is applied. The radius bar with its wings, which are hingedly mounted to the underframing of the vehicle or wheel carrying truck, is the equivalent of a direct radius connection between the axis of the axle and the fulcrum of the tool holders, insofar as it is possible to obtain without wheel and axle removal from the truck.

The radius bar, having a journal connection with the axle, allows sufficient freedom for the axle for rotation when the vehicle is moved to rotate the wheels for machining. Upon relieving the pressure from the brake beam, it will automatically retreat, releasing the cutters from the work. As it is the requirement that both of the wheels upon an axle be of uniform diameter, it is preferable to turn both at the same time, and therefore appropriate gauging of the wheels is first made to determine the degree that they are out of round and the amount of material that must be cut off to a uniform diameter.

The parts of the radius beam are suitably adjusted, so that the axle straddling yoke 21 is set to a proper height on the vertical limb 19 and the horizontal limb 33 has a proper reach to rest upon the brake beam. After the brackets 43 have been fixed to the vehicle underframing, the outer ends of the limbs 39 are adjusted to bring the same into parallelism with the brake beam, or to an appropriate relative position thereto. The stop screws 26 on the limbs are adjusted and set to establish a definite cutting depth for the cutters, by limiting the pressure movement of the brake beam.

The tool holders and cutters are substituted upon the hangers 5 for the brake heads and the shoes. The setting adjustment of the parts initially is governed for obtaining a degree of cut which may be termed a roughing cut to machine the surfaces of the treads or tires most out of round, or advisable to take off in one setting without straining or injuring the apparatus; whereupon, the stop lugs are brought to successive settings, if necessary, as the work progresses to smooth and finish the surfaces of both wheels to a uniform diameter. The cutters, therefore, are set relative to the tread of the tires to procure a definite depth of cut when the pressure is applied, and this is held constant for one or more complete revolutions of the wheels, and any change or alteration in the depth of cut requires a resetting of the stops or of the cutting tools within the holders which can be accomplished by introducing different gauges of shims within the holder behind the cutters, and thereby avoid change in adjustment of the stops.

Having described my invention, I claim:

1. In a device for machining the worn tread or tires of wheels of a railway vehicle, the vehicle employing brake mechanism including a brake beam, the beam at its opposite ends carrying brake heads, each holding a shoe for engagement with the wheel tread on applying a braking pressure to the beam in combination with a tool holder substituted for a brake head and shoe, and carrying a cutter to act upon the tread of a wheel, a radius bar disposed between the axle of a pair of wheels and brake beam in journal connection with the axle and slidably with the brake beam, a pair of links extending adjacent to the brake beam and laterally respectively from opposite sides of the radius bar, at one end pivotally connected to the radius bar, and the opposite end of each pivotally connected to the wheel supporting underframing of the vehicle, and regulatable stop means carried by each link for engagement with the brake beam to control the degree of active motion of the brake beam and cutters relatively to the wheel treads.

2. In a device for machining the worn tread or tires of wheels of a railway vehicle, the vehicle employing brake mechanism including a brake beam, the beam at its opposite ends carrying brake heads, each holding a shoe for engagement with the wheel tread on applying a braking pressure to the beam in combination with a tool holder substituted for a brake head and shoe, and carrying a cutter to act upon the tread of a wheel, a radius bar disposed between the axle of a pair of wheels and brake beam in journal connection with the axle and slidably with the brake beam, a pair of links extending adjacent to the brake beam and laterally respectively from opposite sides of the radius bar, at one end pivotally connected to the radius bar, a bracket, respectively for each link, removably fixed to and pivotally connecting with an end of the link, the wheel supporting underframing of the vehicle, and regulatable stop means carried by each link for engagement with the brake beam to control the degree of active motion of the brake beam and cutters relatively to the wheel treads.

3. In a device for machining the worn tread or tires of wheels of a railway vehicle, the vehicle employing brake mechanism including a brake beam, the beam at its opposite ends carrying brake heads, each holding a shoe for engagement with the wheel tread on applying a braking pressure to the beam in combination with a tool holder substituted for a brake head and shoe, and carrying a cutter to act upon the tread of a wheel, a radius bar disposed between the axle of a pair of wheels and brake beam in journal connection with the axle and slidably bearing upon the brake beam, and having links extending adjacent to the brake beam and laterally from opposite sides of the radius bar, each connected to the wheel supporting underframing of the vehicle, and regulatable stop means carried by each link for engagement with the brake beam to control the degree of active motion of the brake beam and cutters relatively to the wheel treads.

4. In a device for machining the worn tread or tires of wheels of a railway vehicle, the vehicle employing brake mechanism including a brake beam, the beam at its opposite ends carrying brake heads, each holding a shoe for engagement with the wheel tread on applying a braking pressure to the beam in combination with a tool holder substituted for a brake head and shoe, and carrying a cutter to act upon the tread of a wheel, a radius bar disposed between the axle of a pair of wheels and brake beam in journal connection with the axle and slidably bearing upon the brake beam, and having links extending adjacent to the brake beam and laterally from opposite sides of the radius bar, each connected to the wheel supporting underframing of the vehicle, and regulatable stop means carried by each link for engagement wtih the brake beam to control the degree of active motion of the brake beam and cutters relatively to the wheel treads, and the links at the stops slidably sustained upon the brake beam.

5. In a device for machining the worn tread or tires of wheels of a railway vehicle, the vehicle employing brake mechanism including a brake beam, the beam at its opposite ends carrying brake heads, each holding a shoe for engagement with the wheel tread on applying a braking pressure to the beam in combination with a tool holder substituted for a brake head and shoe, and carrying a cutter to act upon the tread of a wheel, a radius bar disposed centrally between the axle of a pair of wheels and brake beam in journal connection with the axle and slidably with the brake beam, the bar having lateral extensions adjacent the beam and connected to the wheel supporting underframing of the vehicle, each extension carrying an adjustable stop for engagement with the brake beam to control the degree of active motion of the brake beam and cutters relatively to the wheel treads.

FRANK L. HALL.